INVENTOR
Michael Millett
By
Eugene J. Kalil
ATTORNEY

March 24, 1964 M. MILLETT 3,126,448

INTERCOMMUNICATION TELEPHONE SYSTEMS

Filed Oct. 7, 1959 3 Sheets-Sheet 2

INVENTOR
Michael Millett
By Eugene J. Kalil
ATTORNEY

March 24, 1964 M. MILLETT 3,126,448

INTERCOMMUNICATION TELEPHONE SYSTEMS

Filed Oct. 7, 1959 3 Sheets-Sheet 3

INVENTOR
Michael Millett
By Eugene V. Kalil
ATTORNEY 3,126,448
Patented Mar. 24, 1964

3,126,448

INTERCOMMUNICATION TELEPHONE SYSTEMS

Michael Millett, London, England, assignor to Modern Telephones (Great Britain) Limited, London, England, a company of Great Britain Filed Oct. 7, 1959, Ser. No. 844,999
Claims priority, application Great Britain Oct. 8, 1958
4 Claims. (Cl. 179—1)

This invention relates to intercommunication telephone systems.

According to the invention an intercommunication telephone system has at least one station with a transducer arranged to serve as a loudspeaker and also as a microphone, means associated with the or each transducer station for amplifying speech in the two directions of communication and a voice-operated relay for the or each transducer station responsive to the signals in one direction for effecting switching of the circuit connections to a condition for that direction of communication. When the apparatus is operative, the voice-operated relay preferably is normally continuously operative to permit outgoing speech from the transducer and is responsive to incoming signals to connect the transducer to the incoming speech circuit.

The arrangement of the present invention is particularly applicable to intercommunication telephone systems having an automatic exchange. In such a system it may be desirable to provide one or more stations with loudspeaking facilities and each of these stations, in the arrangement of the present invention, has its associated amplifying equipment and voice-operated relay so that such a station may be employed in an intercommunication telephone system without any modification of the equipment at any of the other stations. In particular there is no need for any talk-listen manually-operated switching device and someone using a non-loudspeaker station, for example a station having a telephone handset, may use the equipment in the normal manner when speaking to a transducer station.

Preferably the aforementioned amplifying means comprise two separate amplifiers, one for each direction of speech communication. The use of two amplifiers avoids the multiplicity of relay contacts that would be required to reverse the input and output connections of a common amplifier. To avoid audible clipping of speech signals, the relay should respond to them within a very short time and this is easier to accomplish with a minimum of relay contacts. If two such separate amplifiers are employed, the voice-operated relay may be made responsive to the output of the amplifier for the incoming speech to the associated transducer station. Conveniently this amplifier has at least its last stage operating as a class B amplifier and the changes in direct potential across a load impedance for that last stage due to speech signals may be employed to control the operation of a relay for effecting switching of the transducer between the output of one amplifier and the input of the other. For example, means may be provided for applying the potential developed across this load impedance to the base of a transistor having the operating coil of said relay in its collector circuit.

Preferably delay means are provided to prevent the relay changing over during very short intervals, for example the intervals between syllables of speech.

In a system employing two amplifiers, one for each direction of communication, there may conveniently be provided an auxiliary microphone which is permanently connected to the input of the outgoing speech amplifier, this microphone having an output of a limited amplitude or having an attenuator in circuit such that, when the incoming speech amplifier is connected to feed incoming speech signals to the transducer, the electro-acoustic gain of the whole loop is less than unity. With this auxiliary microphone, someone listening to incoming speech through the transducer can talk back although the speed signals will only be heard faintly at the other end. The operator at the other station will however hear this and as soon as he ceases to talk, the voice-operated relay will switch over to enable the transducer to be used as a microphone and give the full speech volume in the direction from the transducer station to the other station. Thus for incoming speech signals the transducer would be operative as a loudspeaker, whilst for outgoing signals the transducer and the auxiliary microphone would both be effective. Such an arrangement permits someone at the transducer station to interrupt incoming speech in order to make an immediate reply.

In addition to the transducer adapted to act as a loudspeaker and as a microphone, there may be further loudspeakers; for example in a paging system a number of loudspeakers may be required but only one need be used as a microphone for passing a reply. In such an arrangement the voice-operated relay may be arranged in one condition to feed incoming signals to all the loudspeakers but in the other condition to switch only the transducer capable of acting as a microphone to the outgoing speech circuit.

In the following description reference will be made to the accompanying drawings in which.

Figure 1:
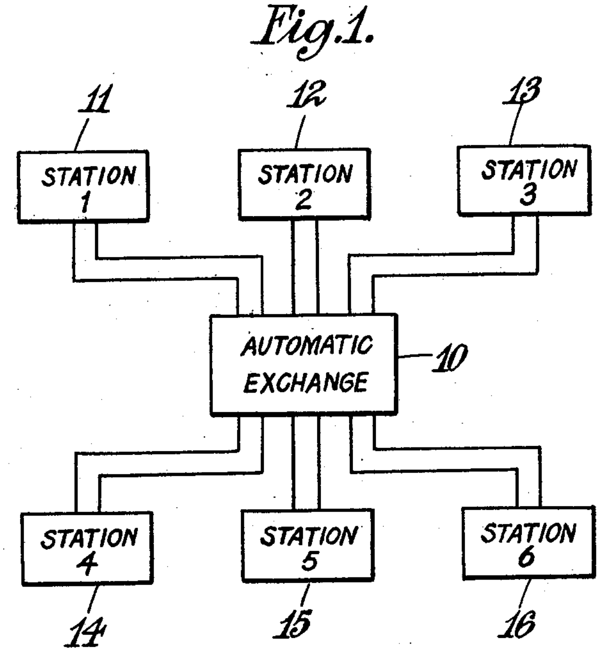
FIGURE 1 is a block diagram illustrating an intercommunication telephone system.

FIGURE 1 illustrates diagrammatically an intercommunication telephone system employing an automatic exchange 10 and a number of stations of which six stations 11 to 16 are illustrated. In such an intercommunication system it is often required that one or more of the stations should be a loudspeaking station and it is convenient that such a station should have a transducer adapted to act also as a microphone. The system is arranged to provide intercommunication between a number of hand-set stations as well as connecting the transducer station to any one of the hand-set stations. There may, of course, be more than one such transducer station and the system permits of intercommunication between such stations. The present invention is concerned primarily with the transducer station and its associated equipment. The handset-stations and automatic exchange may be constructed in the known manner and will not be further described.

Figure 2:
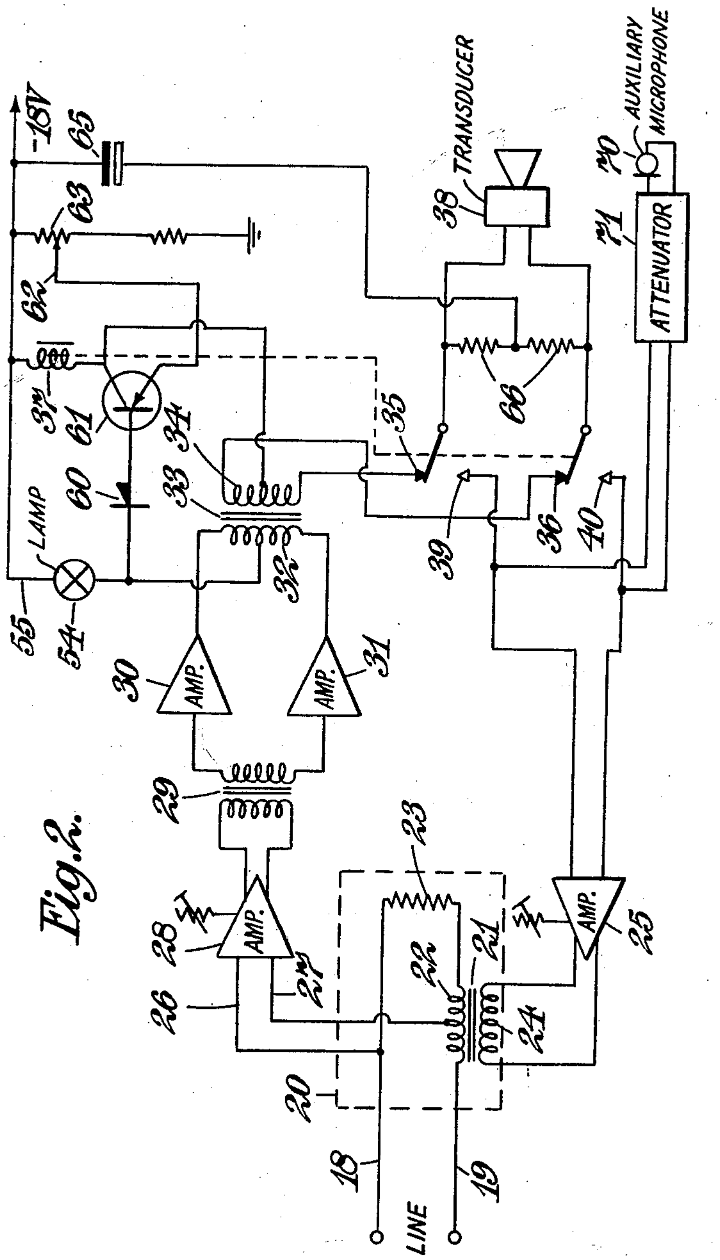
FIGURE 2 is a diagram illustrating one of the stations in the telephone system of FIGURE 1.

FIGURE 2 illustrates diagrammatically a telephone station employing a transducer adapted to act as a loudspeaker and as a microphone. If the telephone system is a three or four line system, the lines from the exchange to the transducer station may be connected appropriately to separate incoming and outgoing speech amplifiers. In FIGURE 2, however, there is illustrated more specifically an arrangement for use in a two-line system, the lines 18, 19 from the exchange being connected to a hybrid balance network 20 which incorporates a transformer 21 having a first winding 22 connected in series with a balancing resistor 23 across the lines 18, 19. The transformer 21 has a second winding 24 which is coupled to the output terminals of a variable gain amplifier 25 for amplifying outgoing speech signals. Incoming speech signals developed between the line 18 and a centre tap on the winding 22 are applied by means of leads 26, 27 to the input terminals of a variable gain amplifier 28, the output of which is coupled by a transformer 29 to two further amplifiers 30, 31 forming a push-pull output stage and operating as a class B amplifier producing output signals across a primary winding 32 of an output transformer 33. The two ends of a secondary winding 34 of this transformer are connected to two fixed contacts 35, 36 of a two pole change-over relay having an operating coil 37 which, when the relay coil 37 is released in a manner to be described later, connects these two contacts 35, 36 to a transducer 38 which is adapted to act as a loudspeaker and also as a microphone. When the relay is energized, the transducer is connected by relay contacts 39, 40 to the input of the outgoing speech amplifier 25.

Figures 3, 4:
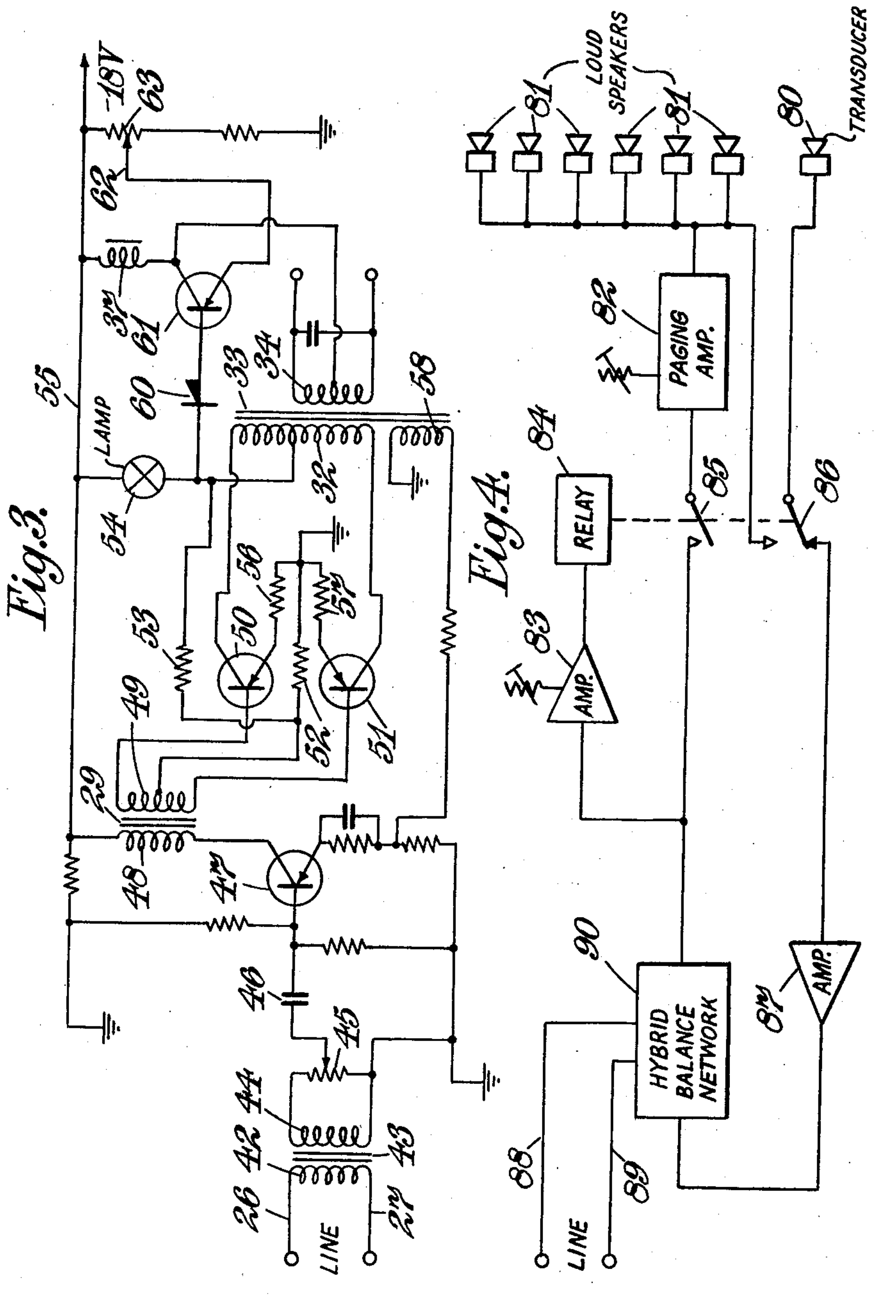
FIGURE 3 is a circuit diagram illustrating in further detail part of the equipment employed in the station of FIGURE 2.
FIGURE 4 is a block diagram illustrating a modified form of station for use in the system of FIGURE 1.

The incoming speech amplifier and its associated circuit is shown in further detail in FIGURE 3. Referring to FIGURE 3, two lines 26, 27 forming the output from the hybrid circuit are connected to the primary winding 42 of an input transformer 43 having a secondary winding 44 shunted by an adjustably tapped resistor 45, which adjustably tapped resistor constitutes the variable gain control for the incoming speech amplifier. The tap on this resistor is connected by a capacitor 46 to the base of a transistor 47 arranged as an amplifier stage and constituting the aforementioned amplifier 28. The output from the transistor 47 is developed across a primary winding 48 of the aforementioned transformer 29, the primary winding being connected in the collector circuit of the transistor 47. The two ends of a secondary winding 49 of the transformer 29 are connected respectively to the bases of two transistors 50, 51 which constitute respectively the amplifiers 30, 31. A centre tap on the winding 49 is connected via a resistor 52 to earth and also via a resistor 53 and a lamp 54 to a negative potential supply line 55. The collectors of transistors 50 and 51 are connected to the two ends of the aforementioned primary winding 32 of the transformer 33 and a centre tap on the primary winding 32 is connected to the junction of the resistor 53 and lamp 54. The emitters of transistors 50 and 51 are connected through load impedances 56, 57 to earth. Negative feedback is provided by a feedback winding 58 on the transformer 33 applying a negative feedback signal to the emitter circuit of the transistor 47.

It will be seen that the transistor 47 forms the first stage of an amplifier driving the two transistors 50, 51 which together constitute a push-pull output stage. These two transistors are arranged to operate as a class B amplifier stage producing output signals across the primary winding of the output transformer 33 so that the incoming speech signals are amplified and fed via this transformer in the manner previously described to the transducer 38. The lamp 54 forms a protective device as is described and claimed in United States application No. 710,232, now U.S. Patent No. 3,101,453. If the current drawn by the transistors 50, 51 should increase, the impedance of the lamp will slowly increase so preventing overloading of the transistors by signals such as would cause a prolonged heavy current to be drawn from the supply but not limiting the handling capacity for short duration signals such as the peak amplitude signals due to speech currents.

The coil 37 of the aforementioned relay is energised by a transistor circuit responsive to changes in the direct potential across an impedance 53 in the direct current circuit for the emitters of the transistors 50, 51. The centre tap of the primary winding 32 of the transformer 33 is connected via a rectifier 60 to the base of a further transistor 61 the collector of which is connected through the operating coil 37 of the aforementioned relay to the aforementioned negative supply line 55 as shown in FIGURE 1. The emitter of this further transistor 61 is connected to a tap 62 on an adjustable potentiometer 63 connected between said negative potential supply line 55 and earth.

The potential of the emitter of the transistor 61 is adjusted so that, if the incoming speech amplifier is switched on but there are no incoming speech signals, the relay is normally operated. When speech signals are received, the potential on the base of the transistor 61 rises because of the increased current through the load impedance 53 and the transistor 61 is cut-off so that the relay coil 37 is de-energised and the relay contacts change over. The rectifier 60 in the base circuit of the transistor 61 is arranged so that it is normally conducting. When the potential at the collectors of the output transistors 50, 51 falls, the control current through the base-emitter circuit of the transistor 61 falls disproportionately due to the increase in the rectifier impedance at small applied potentials. Since therefore the current through the relay coil 37 in the collector of the transistor 61 decreases proportionally to a power of the rise in input signal, the switching action is improved. To delay re-operation of the relay when the transistor becomes conducting again, there is provided a delay circuit comprising a capacitor 65 which is effectively shunted across the relay coil 37 but which, to avoid affecting the speech signals, is effectively a phantom circuit on the transducer line. For this purpose the collector of said further transistor 61 is connected not only to one end of the relay coil 37 but also to the mid point of the secondary winding 34 of the aforementioned transformer 33; the other end of the relay coil is connected via said capacitor 65 to a centre tap on a resistive potentiometer 66 connected across the loudspeaker terminals. This capacitor 65 has a sufficiently large capacity so that the relay will not release in the intervals between syllables of speech on the incoming speech circuit. It will be seen the delay only occurs when speech stops. When speech starts, the capacitor is ineffective to cause any delay because the phantom circuit is broken at the relay terminals, the aforementioned resistive potentiometer 66 being across the loudspeaker terminals between the transducer 38 and the relay contacts.

An auxiliary microphone 70 in series with an attenuator 71 can be connected across the input to the outgoing speech amplifier 25. This auxiliary microphone 70 is located adjacent the loudspeaker 38 so that, when the voice-operated relay is conditioned for outgoing speech, the auxiliary microphone 70 and the loudspeaker 38 both act as microphones. When incoming speech signals are being received, however, only the auxiliary microphone 70 can transmit outgoing speech and the attenuator 71 is arranged to attenuate the signals from the auxiliary microphone 70 to such an extent that the electro-acoustic gain around the complete loop when the loudspeaker 38 is acting as a loudspeaker and not as a microphone is less than unity. This auxiliary microphone 70 thus gives relatively weak speech signals but enables someone at the loudspeaker station to break in to a conversation even when incoming speech signals are being received. As soon as the speaker at the other station ceases to speak on hearing these relatively weak signals, the voice-operated relay will change over permitting normal speech communication from the loudspeaking station to the other station.

The loudspeaker station can be provided with an indicator lamp (not shown) to indicate when the loudspeaker is acting as a microphone or when the equipment has been energised. Additionally or alternatively a key (not shown) may be provided for preventing the loudspeaker being used as a microphone so as to avoid the possibility of the loudspeaker being used by another station for "eavesdropping."

Yet another additional key (not shown) may be provided to enable a person at the loudspeaker station to over-ride the voice operated relay and so break in without any necessity to provide an auxiliary microphone.

As shown in FIGURE 4, a loudspeaker microphone station having a transducer 80 which can act as a loudspeaker and as a microphone may be associated with a number of paging loudspeakers 81 and in that case, it may be convenient to provide a separate high power amplifier 82 to feed the paging loudspeakers and the transducer 80 which can act as a loudspeaker or as microphone in addition to an amplifier 83 for providing control signals for the voice-operated relay 84. In that case the voice-operated relay may be arranged by means of a contact 85 to switch the input to the main speech amplifier 82, which may be a variable gain amplifier, as well as to operate a change-over contact 86 for connecting the transducer 80 either to the input of the outgoing speech amplifier 87 or to the output from the incoming speech amplifier 82. The incoming speech amplifier 82 and the outgoing speech amplifier 87 are connected to lines 88, 89 leading to an exchange by means of a balanced hybrid unit 90.

It will be seen that two or more transducer stations such as have been described above with reference to FIGURES 2 and 3 or with reference to FIGURE 4 may be used for communication with one another or one such station may be used for communication with a hand-set station without any modification of the hand-set station from conventional practice for such hand-set stations in an intercommunication telephone system.

I claim:

1. In an intercommunication telephone system having at least one station with a transducer arranged to act as a loudspeaker and also to serve as a microphone, the combination at said one station of first and second separate amplifiers, each with an input and an output, for amplifying speech signals in the incoming and outgoing directions of communication respectively, circuit means which switchably connect said transducer alternatively to the output of said first amplifier or the input of said second amplifier, and a relay operatively coupled to circuit means to connect said transducer alternatively to one or other of said two amplifiers, wherein the first amplifier has at least one stage operating as a class B amplifier, said one stage having a load impedance, and wherein means operatively connected to said relay are provided, which means are responsive to the direct potential across said load impedance due to speech signals to control the operation of said relay.

2. The combination as claimed in claim 1 wherein said first amplifier is a multi-stage amplifier having its last stage operating as a class B amplifier and wherein said load impedance is arranged in said last stage.

3. In an intercommunication telephone system having at least one station with a transducer arranged to act as a loudspeaker and also to serve as a microphone, the combination at said one station of first and second separate amplifiers, each with an input and an output, for amplifying speech signals in the incoming and outgoing directions of communication respectively, circuit means which switchably connect said transducer alternatively to the output of said first amplifier or the input of said second amplifier, a relay which is operatively coupled to said circuit means to connect said transducer alternatively to one or the other of said two amplifiers, wherein the first amplifier has at least one stage operating as a class B amplifier, said one stage having a load impedance, and wherein means are provided which are connected to said relay and are responsive to the direct potential across said load impedance due to speech signals to control the operation of said relay, an auxiliary microphone which is permanently connected to said second amplifier, and delay means arranged to prevent said relay from changing over during very short intervals of speech.

4. In an intercommunication telephone system having at least one station with a transducer arranged to act as a loudspeaker and also to serve as a microphone, the combination at said one station of first and second separate amplifiers, each with an input and an output, for amplifying speech in the incoming and outgoing directions of communication respectively, circuit means which switchably connect said transducer alternatively to the output of said first amplifier or the input of said second amplifier, and a relay operatively coupled to said circuit means to connect said transducer alternatively to one or other of said two amplifiers, wherein the first amplifier has at least one stage operating as a class B amplifier, said one stage having a load impedance, and wherein means operatively connected to said relay are provided responsive to the direct potential across said load impedance due to speech signals to control the operation of said relay, wherein said means responsive to direct potential comprises a transistor having at least a base and a collector, to the base of which is applied said direct potential and wherein said relay has an operating coil connected in series with said collector to be responsive to the current flow through said collector.

References Cited in the file of this patent

UNITED STATES PATENTS

| | | |
|---|---|---|
| 2,424,069 | Tschumi | July 15, 1947 |
| 2,477,275 | Tschumi | July 26, 1949 |
| 2,516,776 | Johnson | July 25, 1950 |
| 2,545,478 | Levy | Mar. 20, 1951 |
| 2,764,637 | Adler | Sept. 25, 1956 |
| 2,819,340 | Brody | Jan. 7, 1958 |
| 2,951,123 | De Vito | Aug. 30, 1960 |
| 2,964,598 | Parker | Dec. 13, 1960 |
| 3,050,582 | Faherty | Aug. 21, 1962 |

FOREIGN PATENTS

| | | |
|---|---|---|
| 736,988 | Great Britain | Sept. 14, 1955 |